June 3, 1958  F. W. FRINK  2,837,638
PULSE GENERATOR
Filed June 3, 1953  2 Sheets-Sheet 1

June 3, 1958     F. W. FRINK     2,837,638
PULSE GENERATOR
Filed June 3, 1953     2 Sheets-Sheet 2
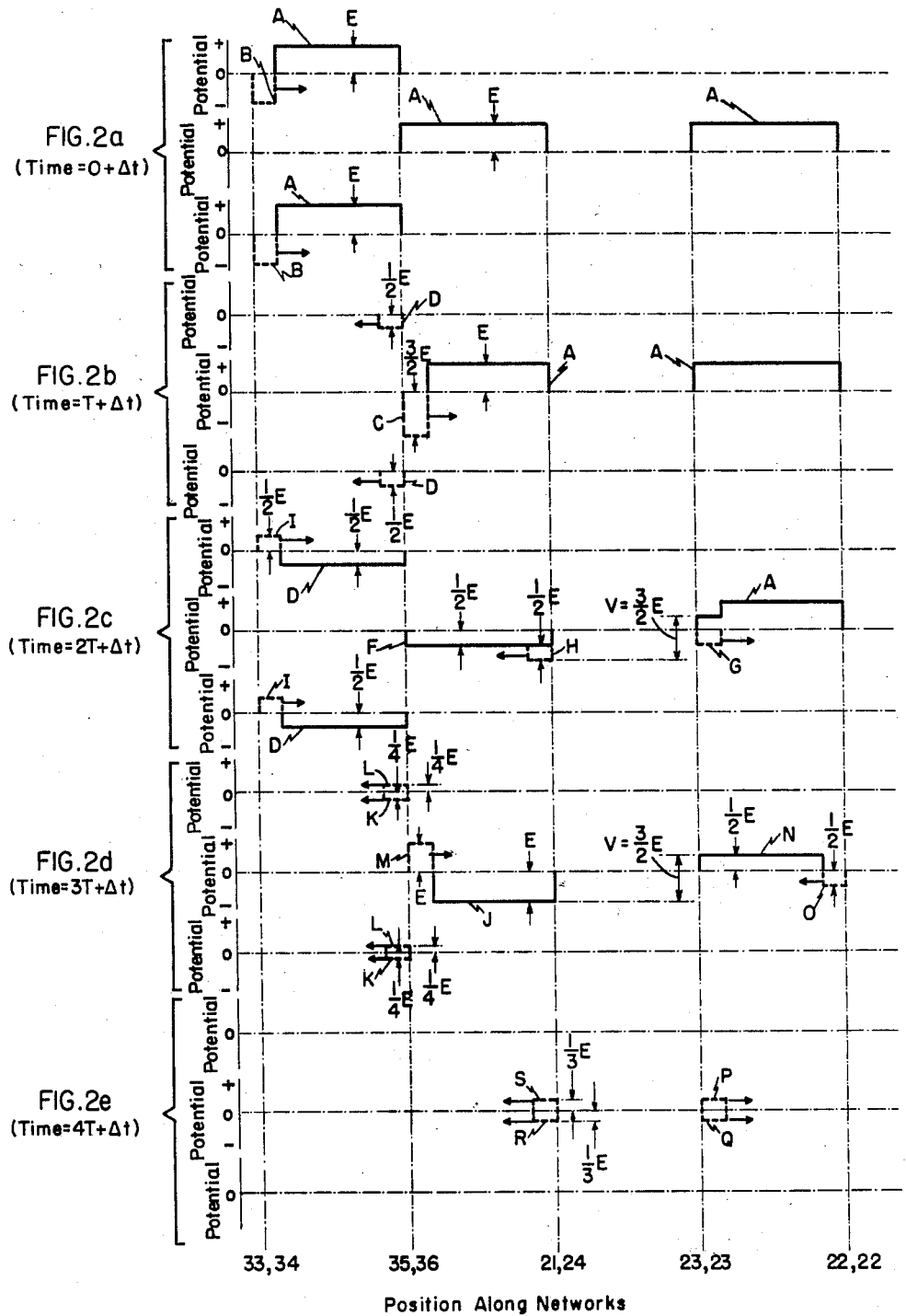

United States Patent Office 2,837,638
Patented June 3, 1958

2,837,638

PULSE GENERATOR

Frederick W. Frink, Los Angeles, Calif., assignor to Hazeltine Research, Inc., Chicago, Ill., a corporation of Illinois Application June 3, 1953, Serial No. 359,379

15 Claims. (Cl. 250—27)

General

The present invention relates to pulse generators and, particularly, to such generators employing pulse-shaping energy-storage networks of the transmission-line type capable of producing time-spaced pulses by the periodic charging and discharging of the energy-storage networks. Hereinafter, the term "pulse-shaping energy-storage network" is used to designate a wave-transmission network such as an actual transmission line as well as an artificial or lumped-constant transmission line.

In many radar and radio navigation systems, it is desirable to develop pulses of high voltage and high power for short time intervals at high recurrence rates from low-voltage, low-power sources. Heretofore, there have been employed generators which utilize energy-storage devices that are periodically charged and then discharged to produce large values of power in an output circuit. Artificial transmission lines have been used as the energy-storage devices since they are capable of translating pulses of energy having substantially rectangular wave form and controllable durations which may be exceedingly short, for example, of the order of a microsecond or less. These generators, however, generally require either a high-voltage source for charging the transmission lines or a transformer for stepping up the voltage of the developed pulses.

There has heretofore been proposed one form of generator for generating high-voltage pulses that has several pulse-shaping energy-storage networks connected in cascade between their discharging or switching means and the output circuit. This generator has the advantage of being able to produce high-voltage pulses from a low-voltage source. It has the further advantage of being able to achieve voltage multiplication of rectangular pulses without recourse to the use of transformers. Voltage multiplication is achieved by means of voltage augmentation at properly proportioned impedance mismatches at the junctions of the pulse-shaping energy-storage networks, these mismatches being determined by the different characteristic impedances of the various networks. This method of voltage multiplication enables the amplitude of rectangular voltage pulses to be multiplied greatly with substantially no degradation of wave form. This form of generator is limited, however, by the power-handling capacity of the switching device, which limits the power that can be delivered to the output circuit. In order to stay within the rating of any given switching device, the product of pulse power and recurrence rate must not exceed a predetermined value.

It is an object of the invention, therefore, to provide a new and improved pulse generator which substantially avoids one or more of the above-mentioned limitations of such generators of the prior art.

It is a further object of the invention to provide a relatively uncomplicated pulse generator which is capable of supplying high-voltage, high-power pulses of rectangular wave form at a relatively high recurrence rate.

It is another object of the invention to provide a new and improved pulse generator which is capable of supplying high-voltage, high-power pulses of rectangular wave form at a relatively high recurrence rate from a low-voltage, low-power source.

In accordance with the invention, a pulse generator comprises a plurality of pulse-shaping energy-storage networks, each network having a first pair of terminals at one end and a second pair of terminals at the other end, corresponding ones of the second terminals being coupled together to form a pair of terminals common to all of these networks. The generator further includes a pulse-utilization device coupled to the aforesaid common terminals. The pulse generator also has energizing circuit means coupled to the networks for charging all of the networks during recurring intervals and a plurality of switching devices individually coupled to the first pairs of terminals of the plurality of networks for discharging the networks during intervening intervals to deliver pulses to the utilization device.

For a better understanding of the present invention, together with one and further objects thereof, reference is had to the following description taken in connection with the accompanying drawings, and its scope will be pointed out in the appended claims.

Figure 1:
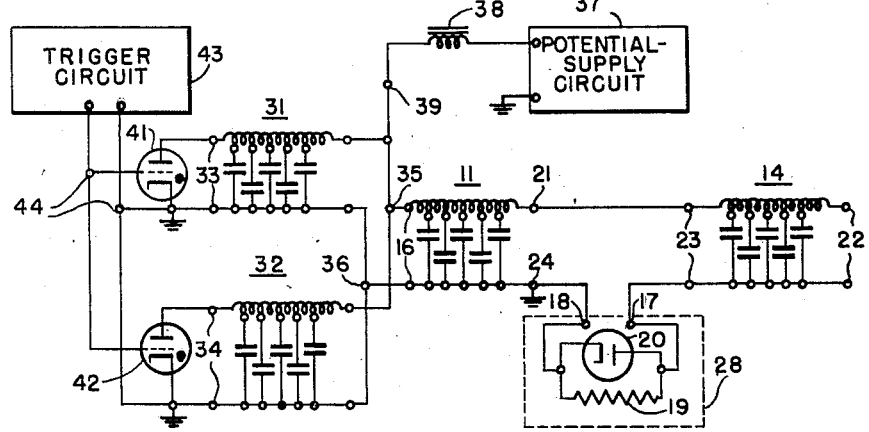
Fig. 1 is a circuit diagram, partly schematic, of a pulse generator in accordance with a particular form of the present invention.

Referring to the drawings:

Fig. 2 is a series of graphs used to explain the operation of the generator of Fig. 1;

Description of Fig. 1 pulse generator

Referring now more particularly to Fig. 1 of the drawings, there is represented a pulse generator in accordance with the invention comprising at least one pulse-shaping energy-storage network and, in the embodiment there represented, the two networks 11 and 14. These energy-storage networks include input connections comprising the terminals 16, 16 and output connections comprising the terminals 17, 18. The output terminals 17, 18 are coupled to a pulse-utilization device 28 represented schematically by a resistor 19 and a unidirectionally conductive device, such as a charging diode 20 connected in parallel. The resistor 19 represents what in actual use may be a magnetron, resonant cavity, or other device requiring recurrent voltage pulses for operation. The diode 20 represents a low-impedance path for charging the network 14, and may be replaced by an element such as a winding having a suitable impedance characteristic. The network 14, which serves to isolate the pulse-utilization device 28 from a high-potential terminal 21 of network 11, has a high-impedance termination at the end thereof represented by terminals 22, 22, which may be an open circuit as shown. The isolating network 14 includes means for coupling the other end thereof, represented by terminals 23, 23, between the high-potential terminal 21 of the pulse-shaping energy-storage network 11 and the pulse-utilization device 28.

The pulse generator further includes a plurality $p$ of additional pulse-shaping energy-storage networks such as the networks 31 and 32. The networks 31, 32 also individually include first pairs of terminals 33, 33 and 34, 34, respectively, and include a second pair of terminals 35, 36 common to the networks and coupled to the input terminals 16, 16 of network 11.

The pulse generator also includes energizing circuit means coupled to the pulse-shaping energy-storage networks for charging those networks during recurring intervals. The energizing circuit means includes a unidirectional potential-supply circuit 37 which is coupled by means of a charging inductor 38 to a suitable input terminal 39 of the network for D. C. resonant charging of the networks. D. C. resonant charging, however, is not mandatory and the inductor 38 may be replaced by any other suitable impedance. The point along the ungrounded side of the networks to which the energizing circuit means is connected is not critical.

The pulse generator additionally includes a plurality of $p$ switching devices individually coupled to the first pairs of terminals 33, 33 and 34, 34 of the plurality of $p$ networks for initiating the discharge of all the networks during intervals between the recurring charging intervals. As represented in Fig. 1, the switching devices may consist of gaseous electron-discharge tubes or thyratrons 41 and 42 coupled to the terminals 33, 33 and 34, 34, respectively. A conventional trigger circuit 43 such as a blocking oscillator or a multivibrator circuit is coupled to the control electrode-cathode circuits of the tubes 41 and 42 through common input terminals 44, 44.

Operation of Fig. 1 pulse generator

In considering generally the operation of the pulse generator just described, it will be assumed initially that the energizing circuit means comprising the potential-supply circuit 37 and the charging inductor 38 has charged all the pulse-shaping energy-storage networks in a conventional manner to a predetermined positive potential. Proper charging of network 14 is achieved by means of diode 20 which constitutes, for the positive charging potential, a low-impedance path from one side of the network to ground. As a result of D. C. resonant charging afforded by the charging inductor 38, the predetermined charging potential to which the networks are charged is approximately twice the D. C. potential of the potential-supply circuit 37.

The application of a triggering pulse by the trigger circuit 43 to the tubes 41 and 42 is effective to render the tubes conductive, thereby initiating the discharge of the networks. The discharge is in the form of a negative potential wave which moves from the terminals 33, 33 and 34, 34 towards the output terminals 17, 18 and discharges the networks as it progresses. When the traveling potential wave arrives at a junction between networks of different characteristic impedances, a fraction of the incident potential wave is reflected back into the network from which it came and a fraction of the incident wave is translated into the second network. The networks are designed so that the translated fraction of the potential wave is increased in magnitude at each junction between successive networks. A negative pulse of predetermined duration, therefore, results across the output terminals 17, 18 which is of a magnitude greater than the predetermined positive charging potential.

The magnitude of the negative pulse across the output terminals is substantially equal to $n/2$ times the predetermined positive potential to which the networks were originally charged where $n$ again denotes the total number of networks except that the plurality of $p$ networks is counted as a single network. The potential increase is achieved by the selection of networks with effective characteristic impedances which increase in a direction proceeding from the terminals 33, 33 and 34, 34. The arrangement is also designed so that the reflected potential waves effectively cancel each other so that only a single pulse results at the output terminals 17, 18 during each discharge period of the network system. Effective cancellation of the reflected wave is dependent on the time delays and the characteristic impedances of the networks. The desired characteristic impedance relationships are given hereinafter for the case where the individual networks have substantially equal delay times.

Mathematical expressions for determining the desired characteristic impedances of the networks of a pulse generator comprising a plurality of cascade-connected networks and an isolating network such as in the present invention are developed and described in United States Patent 2,420,302—Darlington. The expressions there developed are applicable to the present invention even though the pulse generator there described differs from the present invention in that it does not employ a plurality of switching devices and networks coupled thereto. One of these expressions is a general expression for determining the desired impedance of any network in the cascaded chain of networks. As the desired impedances change in a regular manner from one network to the next, a general expression for the impedance of any network may be developed in terms of the position of the network and the total number of networks in the chain. This is essentially what has been done in the described general expression. The following expressions for the present invention, which differ from those of the above-mentioned patent, have been derived therefrom primarily by enumerating or by modifying the position parameter of the described general expression. Accordingly, a detailed derivation of the expressions given herein is unnecessary.

Each of the pulse-shaping energy-storage networks 11, 14, 31, and 32 has substantially linear phase-shift characteristics and is substantially dissipationless in character. These requirements are necessary to the development of pulses of substantially rectangular wave form across the output terminals 17, 18. Each of the networks also has a one-way time delay which is substantially equal to one-half the duration of an output pulse. The characteristic impedance of the pulse-shaping energy-storage network 11 is determined by the expression:

$$\frac{6R_L}{n^2} \qquad (1)$$

wherein $R_L$ = the effective impedance of the pulse-utilization device 28

$n$ = the total number of networks with the $p$ networks considered as a single network.

The isolating network 14 has a characteristic impedance determined by the relation:

$$\frac{R_L}{n} \qquad (2)$$

Each of the plurality of $p$ networks 31 and 32 has a characteristic impedance determined by the expression:

$$\frac{2pR_L}{n^2} \qquad (3)$$

The characteristic impedance of each of the $p$ networks 31, 32 may also be expressed in terms of the transient characteristic impedance $Z$ presented at the input terminals 16, 16 by the network 11. This expression is $$\frac{pZ}{3} \qquad (4)$$

Considering now in greater detail the operation of the pulse generator of Fig. 1 with reference to Fig. 2, it will be assumed initially that the tubes 41 and 42 are in a nonconductive condition and the pulse-shaping energy-storage networks 11, 14, 31, and 32 are charged to a predetermined positive potential E as represented by curve A of Fig. 2a. At this instant, corresponding to zero time, the switching devices 41 and 42 become conductive, thus placing low-impedance discharge paths across the pairs of terminals 33, 33 and 34, 34 of networks 31 and 32. These low-impedance discharge paths are effectively short circuits and give rise to progressive discharge effects that correspond to traveling potential waves of negative polarity in each of the networks 31 and 32, as indicated by the broken-line curves B of Fig. 2a. These negative waves start traveling towards the right and in the time interval $\Delta t$ the negative waves have progressed a small distance as indicated in Fig. 2a. These waves are of the same magnitude as, but of opposite polarity to, that to which the networks were originally charged. Therefore, as the negative waves progress to the right, they effectively cancel out the original potential on the network, leaving the traversed portion of the network at zero potential.

At the instant of time T, the negative waves as represented by curves B have reached the junction between the networks 31 and 32 and the network 11. At the junction a fraction of the negative potential wave from network 31 is reflected back into network 31. This reflected fraction, which is not shown in the graph, has a magnitude of ¼E and is of positive polarity because the effective impedance presented by the networks 32 and 11 is less than the impedance of the network 31. A second fraction of the incident wave is translated to each of the networks 11 and 32. This translated fraction, which is also not shown, has a magnitude of ¾E and is of negative polarity because the translated wave is always of the same polarity as the incident wave. Because of the symmetry of the arrangement, a similar result occurs with the wave incident from the network 32.

The resultant wave reflected back into the network 31 is represented by curve D of Fig. 2b and is the algebraic sum of the positive reflected wave of magnitude ¼E and the negative translated wave of magnitude ¾E and is therefore a negative wave of magnitude ½E. A similar resultant wave is reflected back into the network 32. A negative potential wave of magnitude ³⁄₂E represented by curve C of Fig. 2b, which is the sum of the negative waves translated by each of the networks 31 and 32, is translated into the network 11. The negative potential wave C, as it progresses to the right, cancels out the original potential E to which the network 11 was charged. This wave, however, is of greater magnitude than the original potential by ½E. Therefore, the fraction of it not used in canceling out the original potential remains on the network as a negative charge of ½E as represented by curve F of Fig. 2c.

Since the tubes 41 and 42 are gas tubes, they remain conductive for an interval greater than 2T and, at the instant 2T when the waves D traveling towards the left in networks 31 and 32 have returned to the terminals 33, 33 and 34, 34, these terminals are still effectively short-circuited. Because the terminals are effectively short-circuited, these waves are completely reflected back towards the right but are of opposite polarity, namely, positive. These reflected waves, as represented by curves I of Fig. 2c, are effective to cancel out the negative potential that was previously left on these networks by the waves D. Also at the instant 2T, the negative wave C has reached the terminals 21, 24, of network 11. At this point, a fraction of wave C is translated into the subsequent units, namely, the network 14 and the pulse-utilization device 28. The network 14 and the pulse-utilization device 28 are effectively in series and their series impedance is greater than that of network 11. Hence, voltage multiplication occurs. The translated wave, which is not shown, is of magnitude 2E while that of the incident wave C was only ³⁄₂E. Because network 14 and the pulse-utilization device 28 are in series, only a fraction of the translated wave is actually translated into the network 14, as represented by curve G of Fig. 2c and is negative and of magnitude ½E. As wave G progresses to the right, it cancels part of the original potential. Another fraction of the incident wave C is reflected back into the network 11 and progresses to the left, as represented by curve H of Fig. 2c. This reflected wave H is of the same polarity as the incident wave C because the effective impedance of the network 14 and the pulse-utilization device 28 in series is greater than the impedance of the network 11. Being of negative polarity, the wave H adds to the potential represented by curve F remaining from the passage of the wave C.

At instant 3T, the wave H has reached the pair of input connections 16, 16. At the same instant, the positive waves I have reached the same connections. The fraction of wave H which is translated into each of the networks 31 and 32, as represented by curve K of Fig. 2d, is equal to and of opposite polarity from the resultant waves L of Fig. 2d reflected back into these networks because of waves I. Two waves of equal magnitude and opposite polarity traveling together cancel each other and effectively cease to exist. Therefore, waves K and L will subsequently be disregarded. The fraction of wave H that is reflected back into the network 11 combines with the fractions of the waves I which are translated into that network to give a resultant positive wave of magnitude E, as represented by curve M of Fig. 2d, traveling towards the right. The wave M is equal to but of opposite polarity from the potential to which the network 11 was previously charged. As this wave M progresses to the right, it effectively cancels out the previous charge represented by curve J of Fig. 2d leaving the traversed portion of the network with zero potential. In the meantime, the wave G which was translated into the network 14 has arrived at the terminals 22, 22 of that network and has been reflected back towards the left. Because the termination across these terminals 22, 22 is an open circuit, the reflected wave O of Fig. 2d is of the same polarity and magnitude as the incident wave G. This reflected wave O is effective to cancel out the remaining potential on the network 14, as represented by curve N of Fig. 2d.

At the instant 4T, the reflected wave O has reached the terminals 23, 23 of the network 14 at the same time the wave M has reached the terminals 21, 24 of the network 11. The fraction P of Fig. 2e of the wave M translated into the network 14 is equal to, and of opposite polarity from, the fraction Q of the wave O which is reflected back into the network 14. The same is true of the fraction R of Fig. 2e of the wave O that is translated to the network 11 and the fraction S of wave M which is reflected back into the network 11. Two waves of equal magnitude and opposite polarity traveling together cancel each other and effectively cease to exist. Thus, at and subsequent to the instant 4T, all of the networks of the pulse generator are completely discharged. Subsequently, the tubes 41 and 42 become non-conductive, thus removing the low-impedance paths between the terminals 33, 33 and 34, 34. This permits the circuit 37 to recharge the networks and, after the charging operation is completed, the cycle is repeated by the application of another trigger pulse from unit 43.

The output pulse is the recurrent potential developed across output connections 17, 18. As will be noted from the graphs, this potential changes from a value of zero to a value V equal to ³⁄₂E at the instant of time 2T and remains fixed at this value until the later instant 4T at which time it falls to zero again. The value V as shown in Figs. 2c and 2d represents only the magnitude and does not indicate the polarity of the output pulse. The polarity across the output connections 17, 18 varies from zero to a negative value. The output pulse is thus rectangular in shape and the duration is equal to a time corresponding to 2T, which is twice the one-way delay time of an individual network. The magnitude of the output pulse is substantially ³⁄₂ the potential E applied to the networks by resonant charging and thus nearly three times the potential supplied by the source 37.

The generator of the present invention is capable of supplying pulses of substantially rectangular wave form and of substantially higher potential than that of its energizing circuit. Furthermore, since the present invention permits use of a plurality of thyratron switching devices, power delivered to the output circuit of the generator is is relatively high with respect to the ratings of the individual thyratrons. A plurality of relatively small and inexpensive thyratrons, therefore, can be used instead of a single large, expensive thyratron, with considerable saving in cost.

Figure 3:
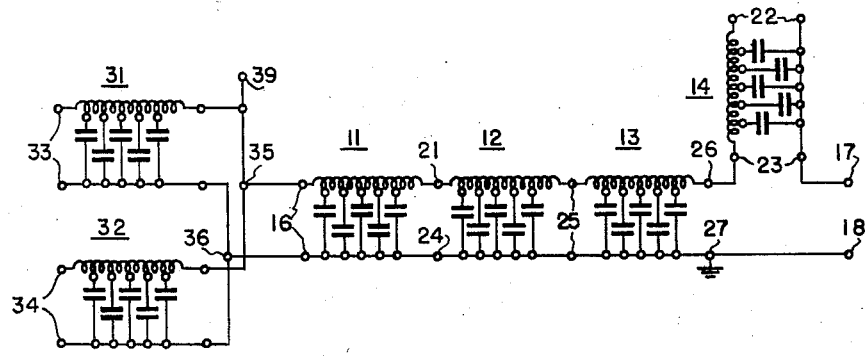
Fig. 3 is a circuit diagram showing a modified form of a portion of the pulse generator of Fig. 1.

Description of Fig. 3 arrangement

Referring now to Fig. 3 of the drawings, there is represented schematically another system of pulse-shaping energy-storage networks that may be used in lieu of those represented in Fig. 1, corresponding elements being indicated by the same reference numerals. The arrangement of pulse-shaping energy-storage networks of Fig. 3 is identical to that of Fig. 1, except that the additional networks 12 and 13 have been connected in cascade between networks 11 and 14. The networks 11, 12, and 13 constitute a plurality of cascade-connected pulse-shaping energy-storage networks having individual characteristic impedances which progressively increase proceeding to the right from their input connections represented by the terminals 16, 16. The major difference between these networks and the corresponding networks of Fig. 1 is in the values of the characteristic impedances. Equation 1 is applicable to Fig. 3 but is merely a special case of the general expression for determining the characteristic impedances of the cascade-connected networks. The general expression which was derived from the corresponding expression in the abovementioned patent by modifying the position parameter $r$ is:

$$Z_r = \frac{R_L(r+2)(r+1)}{n^2} \qquad (5)$$

where $Z_r$ denotes the characteristic impedance of the $r$th network of the cascade-connected networks counting from the pair of input terminals 16, 16.

Equations 2 and 3 which define the characteristic impedances of the isolating network 14 and the plurality of $p$ networks represented by the networks 31 and 32 of Fig. 1 are equally applicable to Fig. 3. As is seen from the equations, the values of the characteristic impedances calculated therefrom are a function of the total number of networks and, as the number of networks in the Fig. 3 arrangement differs from that of Fig. 1, the characteristic impedances of corresponding networks also differ. The voltage multiplication in either the circuit of Fig. 3 or that of Fig. 1 is such that the output pulse developed at the terminals 17, 18 has a magnitude substantially equal to $n/2$ times the predetermined potential to which the networks were originally charged.

Operation of Fig. 3 arrangement

The operation of the Fig. 3 arrangement is substantially the same as that of Fig. 1 except that in Fig. 3 the greater number of networks in the cascade-connected plurality affords greater voltage multiplication. The incident potential waves and the reflected potential waves that travel back and forth along the networks of Fig. 3 do so in the same manner as in the circuit of Fig. 1, except that in this case there are more networks and hence a greater number of reflections to consider.

While applicant does not intend to limit the invention to any particular design constants, the following values have been found suitable for a six-network arrangement corresponding to that of Fig. 3 and capable of developing a moderately high output potential:

Tubes 41 and 42_____Type 2D21
Potential to which networks charged_____volts__ 500
Output pulse potential_____do____ 1200
Pulse duration_____microsecond__ 0.1
Load impedance_____ohms__ 470

| Network | Characteristic Impedance (ohms) | Capacitance of each of five condensers (μμf.) | Inductance of entire coil (μh.) |
| --- | --- | --- | --- |
| 11 | 113.4 | 158.7 | 10.6 |
| 12 | 227.0 | 79.3 | 21.2 |
| 13 | 378.0 | 47.7 | 35.4 |
| 14 | 94.6 | 190.3 | 8.9 |
| 31 | 75.6 | 238.0 | 7.1 |
| 32 | 75.6 | 238.0 | 7.1 |

Figure 4:
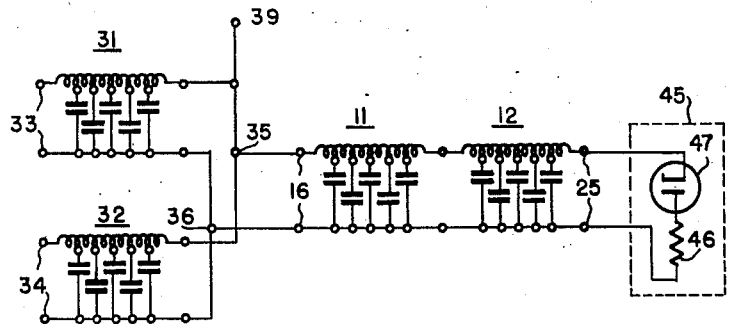
Fig. 4 is a circuit diagram showing another modification of a portion of the pulse generator of Fig. 1.

Description of Fig. 4 embodiment

Referring now to Fig. 4 of the drawings, there is represented schematically a portion of another embodiment of the invention similar to those of Figs. 1 and 3, corresponding elements being identified by the same reference numerals. The Fig. 4 networks have substantially linear phase-shift characteristics and substantially equal one-way time delays. The Fig. 4 embodiment differs from that of Fig. 1 in that there is no network corresponding to the isolating network 14 of Fig. 1. Instead, the pulse-utilization device 45 represented by the resistor 46 and the diode 47 connected in series is connected directly across the output terminals 25, 25 of the last network 12. The diode 47 is connected so that its cathode is coupled to the high-potential side of network 12. In this type of arrangement, the pulse-utilization circuit 45 must present a high impedance to the positive charging potential in order that all of the networks may be satisfactorily charged to the desired predetermined potential. This high impedance requirement is fulfilled by the diode 47 because of its unidirectional conductivity and consequent high back impedance. Of course, a pulse-utilization device such as a magnetron which has unidirectional conductivity would not require a separate diode.

A general expression for the values of the characteristic impedances of cascade-connected pulse-shaping energy-storage networks of a pulse generator of this sort not employing an isolating network is described in United States Patent 2,420,309—Goodall. By modifying the terms containing the position parameter in the described general expression, the characteristic impedances of the cascade-connected networks of the present invention as represented by networks 11 and 12 may be determined by the expression:

$$Z_r = \frac{R_L(r+2)(r+1)}{n(n+1)} \qquad (6)$$

where
$R_L$=the effective impedance of the pulse-utilization device 45,
$Z_r$=the characteristic impedance of the $r$th network of the cascade-connected networks counting from the pair of input terminals 16, 16,
$n$=the total number of networks with the $p$ networks considered as a single network.

By enumerating the position parameter $r$ and inserting the factor $p$ in the described general expression, the characteristic impedance of each of the plurality of $p$ networks represented by networks 31 and 32 may be determined by the expression:

$$\frac{2pR_L}{n(n+1)} \qquad (7)$$

It should be noted that these relationships differ from the corresponding relationships applicable to the circuits of Figs. 1 and 3. As in Fig. 1, the potential multiplication is such that the magnitude of the pulses delivered to the output terminals 25, 25 is substantially $n/2$ times the predetermined potential to which the networks were charged.

Operation of Fig. 4 embodiment

The operation of the pulse generator of Fig. 4 is similar to that of Fig. 1. The tubes 41 and 42 are effective to initiate the discharge of the networks and give rise to negative potential waves which travel towards the pulse-utilization device 45. Similarly, portions of these potential waves are reflected at junctions between networks. Also, as the characteristic impedances of the networks increase progressively in a direction from the tubes 41 and 42 to the utilization device 45, a multiplication of the transmitted portion of the potential waves is obtained. The relationship between the characteristic impedances is also such that only a single pulse results at the output terminals 25, 25 during each discharge period.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A pulse generator for supplying pulses to a pulse-utilization device having an effective impedance of $R_L$ comprising: a plurality of cascade-connected pulse-shaping energy-storage networks including input connections and output connections for coupling to said pulse-utilization device; $p$ pulse-shaping energy-storage networks individually including a first pair of terminals and including also a second pair of terminals common to said $p$ networks and coupled to said input connections; said plurality of networks having characteristic impedances determined by the expression $$Z_r = \frac{R_L(r+2)(r+1)}{n(n+1)}$$

and the characteristic impedance of each of said $p$ networks being determined by the expression $$\frac{2pR_L}{n(n+1)}$$

where $n$ denotes the total number of networks with said $p$ networks considered as a single network and $Z_r$ denotes the characteristic impedance of the $r$th network of said plurality of networks counting from said pair of input connections; energizing circuit means coupled to said networks for charging said networks during recurring intervals; and $p$ switching devices individually coupled to said first pairs of terminals of said $p$ networks for discharging said networks during intervening intervals and developing said pulses at said output connections.

2. A pulse generator for supplying pulses to a pulse-utilization device having an effective impedance of $R_L$ comprising: a plurality of cascade-connected pulse-shaping energy-storage networks including a pair of input connections and a pair of output connections; an isolating pulse-shaping energy-storage network having a high-impedance termination at one end thereof and including means for coupling the other end thereof between a high-potential connection of said pair of output connections and said pulse-utilization device; $p$ pulse-shaping energy-storage networks individually including a first pair of terminals and including also a second pair of terminals common to said $p$ networks and coupled to said pair of input connections; said plurality of networks having characteristic impedances determined by the expression $$Z_r = \frac{R_L(r+2)(r+1)}{n^2}$$

said isolating network having a characteristic impedance determined by the expression $$\frac{R_L}{n}$$

and the characteristic impedance of each of said $p$ networks being determined by the expression $$\frac{2pR_L}{2}$$

where $n$ denotes the total number of networks with said $p$ networks considered as a single network and $Z_r$ denotes the characteristic impedance of the $r$th network of said plurality of networks counting from said pair of input connections; energizing circuit means coupled to said networks for charging said networks during recurring intervals; and $p$ switching devices individually coupled to said first pairs of terminals of said $p$ networks for discharging said networks during intervening intervals and developing said pulses at said output connections.

3. A pulse-shaping energy-storage system comprising: a plurality of cascade-connected pulse-shaping energy-storage networks including a pair of input connections and a pair of output connections; an isolating pulse-shaping energy-storage network having a high-impedance termination at one end thereof and including means for coupling the other end thereof to a high-potential connection of said pair of output connections; $p$ pulse-shaping energy-storage networks individually including a first pair of terminals and including also a second pair of terminals common to said $p$ networks and coupled to said pair of input connections; all of said pulse-shaping energy-storage networks having substantially linear phase-shift characteristics and substantially equal one-way time delays; said plurality of networks having characteristic impedances determined by the expression $$Z_r = \frac{R_L(r+2)(r+1)}{n^2}$$

said isolating network having a characteristic impedance determined by the expression $$\frac{R_L}{n}$$

and the characteristic impedance of each of said $p$ networks being determined by the expression $$\frac{2pR_L}{n^2}$$

where $n$ denotes the total number of networks with said $p$ networks considered as a single network and $Z_r$ denotes the characteristic impedance of the $r$th network of said plurality of networks counting from said pair of input connections.

4. A pulse generator comprising: a plurality of pulse-shaping energy-storage networks, each network having a first pair of terminals at one end and a second pair of terminals at the other end, corresponding ones of the second terminals being coupled together to form a pair of terminals common to all of these networks; a pulse-utilization device coupled to said common terminals; energizing circuit means coupled to the networks for charging all of the networks during recurring intervals; and a plurality of switching devices individually coupled to said first pairs of terminals of said plurality of networks for discharging the networks during intervening intervals to deliver pulses to said utilization device.

5. A pulse generator comprising: a plurality of pulse-shaping energy-storage networks, each network having a first pair of terminals at one end and a second pair of terminals at the other end, corresponding ones of the second terminals being coupled together to form a pair of terminals common to all of these networks; a pulse-utilization device; at least one additional pulse-shaping energy-storage network coupled between said common terminals and said pulse-utilization device; energizing circuit means coupled to the networks for charging all of the networks during recurring intervals; and a plurality of switching devices individually coupled to said first pairs of terminals of said plurality of networks for discharging the networks during intervening intervals to deliver pulses to said utilization device.

6. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; at least one additional pulse-shaping energy-storage network coupled between said common terminals and said pulse-utilization device; the characteristic impedances of the first-mentioned $p$ networks being proportioned so that the total impedance presented thereby at said common terminals when determined in accordance with the rule for impedances in parallel is equal to one-third of the transient characteristic impedance presented at said common terminals by the additional elements coupled thereto; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

7. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; at least one additional pulse-shaping energy-storage network coupled between said common terminals and said pulse-utilization device; the first-mentioned $p$ networks having substantially identical characteristic impedances, each determined by the expression $$\frac{pZ}{3}$$

wherein Z denotes the transient characteristic impedance presented at said common terminals by the additional elements coupled thereto; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

8. A pulse generator for supplying pulses of predetermined duration comprising: a plurality of pulse-shaping energy-storage networks, $p$ in number, each network having a one-way time delay substantially equal to one-half said predetermined pulse duration and each network having a first pair of terminals at one end and a second pair of terminals at the other end, corresponding ones of the second terminals being coupled together to form a pair of terminals common to all of these $p$ networks; a pulse-utilization device; at least one additional pulse-shaping energy-storage network having a one-way time delay substantially equal to one-half said predetermined pulse duration and coupled between said common terminals and said pulse-utilization device; the first-mentioned $p$ networks having substantially identical characteristic impedances, each determined by the expression $$\frac{pZ}{3}$$

wherein Z denotes the transient characteristic impedance presented at said common terminals by the additional elements coupled thereto; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses of said predetermined duration to said utilization device.

9. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; at least one additional pulse-shaping energy-storage network coupled between said common terminals and said pulse-utilization device; the first-mentioned $p$ networks having substantially identical characteristic impedances, each determined by the expression $$\frac{pZ}{3}$$

wherein Z denotes the transient characteristic impedance presented at said common terminals by the additional elements coupled thereto; energizing circuit means coupled to the networks for charging all of the networks during recurring intervals; and a plurality of gaseous electron-discharge switching devices, $p$ in number, individually coupled to said first pairs of terminals of said $p$ networks for discharging the networks during intervening intervals to deliver pulses to said utilization device.

10. A pulse generator for supplying pulses of predetermined duration comprising: a plurality of pulse-shaping energy-storage networks, $p$ in number, each network having a one-way time delay substantially equal to one-half said predetermined pulse duration and each network having a first pair of terminals at one end and a second pair of terminals at the other end, corresponding ones of the second terminals being coupled together to form a pair of terminals common to all of these $p$ networks; a pulse-utilization device; at least one additional pulse-shaping energy-storage network having a one-way time delay substantially equal to one-half said predetermined pulse duration and coupled between said common terminals and said pulse-utilization device; the first-mentioned $p$ networks having substantially identical characteristic impedances, each determined by the expression $$\frac{pZ}{3}$$

wherein Z denotes the transient characteristic impedance presented at said common terminals by the additional elements coupled thereto; energizing circuit means coupled to the networks for charging all of the networks during recurring intervals; and a plurality of gaseous electron-discharge switching devices, $p$ in number, individually coupled to said first pairs of terminals of said $p$ networks for discharging the networks during intervening intervals to deliver pulses of said predetermined duration to said utilization device.

11. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; one additional pulse-shaping energy-storage network having a pair of terminals at one end coupled to said common terminals and having a pair of terminals at the other end coupled to said pulse-utilization device; the first-mentioned $p$ networks having substantially identical characteristic impedances, each determined by the expression $$\frac{pZ}{3}$$

wherein Z denotes the characteristic impedance of said additional network; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

12. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device having one terminal coupled to one of said common terminals; one additional pulse-shaping energy-storage network having a pair of terminals at one end, these terminals being coupled between the other of said common terminals and another terminal of said pulse-utilization device; the first-mentioned $p$ networks having substantially identical characteristic impedances, each determined by the expression $$\frac{pZ}{3}$$

wherein Z denotes the transient characteristic impedance presented at said common terminals by the series-connected utilization device and additional network; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

13. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; one additional pulse-shaping energy-storage network having a pair of terminals at one end coupled to said common terminals and having a second pair of terminals at the other end, one of these second terminals being coupled to one terminal of said pulse-utilization device; a second additional pulse-shaping energy-storage network having a pair of terminals at one end, these terminals being coupled between the other of said second pair of terminals of the first-mentioned additional network and another terminal of said pulse-utilization device; the first-mentioned $p$ networks having substantially identical characteristic impedances, each determined by the expression $$\frac{pZ}{3}$$

wherein Z denotes the characteristic impedance of the first-mentioned additional network which is coupled to said common terminals; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

14. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; a plurality of additional pulse-shaping energy-storage networks coupled in cascade, the cascade having a pair of terminals at one end coupled to said common terminals and a pair of terminals at the other end coupled to said pulse-utilization device, the characteristic impedances of the individual networks of the cascade increasing progressively in a direction away from said common terminals; the first-mentioned $p$ networks having substantially identical characteristic impedances, each determined by the expression $$\frac{pZ}{3}$$

wherein Z denotes the characteristic impedance of the first cascaded network which is coupled to said common terminals; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

15. A pulse generator comprising: a plurality of pulse-shaping energy-storage networks, $p$ in number, each network having a first pair of terminals at one end and a second pair of terminals at the other end, corresponding ones of the second terminals being coupled together to form a pair of terminals common to all of these $p$ networks; a pulse-utilization device; a plurality of additional pulse-shaping energy-storage networks coupled in cascade, the cascade having a pair of terminals at one end coupled to said common terminals and a second pair of terminals at the other end, one of these second terminals being coupled to one terminal of said pulse-utilization device, the characteristic impedances of the individual networks of the cascade increasing progresisvely in a direction away from said common terminals; a further pulse-shaping energy-storage network having a pair of terminals at one end, these terminals being coupled between the other of said second pair of terminals of the cascaded networks and another terminal of said pulse-utilization device; the first-mentioned $p$ networks having substantially identical characteristic impedances, each determined by the expression $$\frac{pZ}{3}$$

wherein Z denotes the characteristic impedance of the first cascaded network which is coupled to said common terminals; energizing circuit means coupled to the networks for charging all of the networks during recurring intervals; and a plurality of switching devices, $p$ in number, individually coupled to said first pairs of terminals of said $p$ networks for discharging the networks during intervening intervals to deliver pulses to said utilization device.

References Cited in the file of this patent
UNITED STATES PATENTS

| | | |
|---|---|---|
| 2,420,302 | Darlington | May 13, 1947 |
| 2,420,309 | Goodall | May 13, 1947 |
| 2,446,838 | Lawrence | Aug. 10, 1948 |
| 2,474,243 | Greenwald | June 28, 1949 |
| 2,496,979 | Blumlein | Feb. 7, 1950 |
| 2,534,261 | Gorham et al. | Dec. 19, 1950 |
| 2,595,301 | Sager | May 6, 1952 |
| 2,606,289 | Stanton | Aug. 5, 1952 |